(12) United States Patent
Hunter et al.

(10) Patent No.: US 9,163,739 B2
(45) Date of Patent: Oct. 20, 2015

(54) HIGH TEMPERATURE COATING RESISTANT TO DAMAGE FROM DECOMPRESSION

(75) Inventors: Rick C. Hunter, Houston, TX (US); Khanh Anh Duong, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 1089 days.

(21) Appl. No.: 13/188,940

(22) Filed: Jul. 22, 2011

(65) Prior Publication Data

US 2013/0020522 A1 Jan. 24, 2013

(51) Int. Cl.
*F16K 25/00* (2006.01)
*F16K 3/36* (2006.01)
*F16K 3/02* (2006.01)

(52) U.S. Cl.
CPC .............. *F16K 25/005* (2013.01); *F16K 3/0263* (2013.01); *F16K 3/36* (2013.01)

(58) Field of Classification Search
CPC ....... F16K 25/005; F16K 3/0263; F16K 3/36; F16K 5/025; F16K 5/045; F16K 5/0657
USPC ......... 251/368, 314, 333, 332, 326–329, 355; 427/299–330; 29/527.2
See application file for complete search history.

(56) References Cited

U.S. PATENT DOCUMENTS

| | | | | |
|---|---|---|---|---|
| 4,178,964 A | * | 12/1979 | Moore et al. | 137/625.4 |
| 6,258,413 B1 | * | 7/2001 | Woelki et al. | 427/402 |
| 7,871,110 B2 | | 1/2011 | Ostergaard et al. | |
| 7,891,420 B2 | | 2/2011 | Dale et al. | |
| 2008/0187667 A1 | * | 8/2008 | Hennessey | 427/299 |

FOREIGN PATENT DOCUMENTS

| | | |
|---|---|---|
| GB | 2431709 A | 5/2007 |
| WO | 2008076855 A1 | 6/2008 |

OTHER PUBLICATIONS

GB Search Report dated Sep. 13, 2012 from corresponding Application No. GB1212693.4.

* cited by examiner

*Primary Examiner* — John K Fristoe, Jr.
*Assistant Examiner* — Andrew J Rost
(74) *Attorney, Agent, or Firm* — Bracewell & Giuliani LLP

(57) ABSTRACT

A coating for use in protecting surfaces susceptible to environmental degradation. The coating may be applied to metallic surfaces for providing a barrier against elements and/or ambient conditions that would otherwise degrade the surface material. The coating includes multiple layers, where a thermoplastic polymer is included, wholly or partly, within one or more of the layers. Example applications of the coating are for protecting valve seat seals and valve stem seals of a valve assembly used in conjunction with handling of fluids produced from a subterranean formation.

28 Claims, 3 Drawing Sheets

HIGH TEMPERATURE COATING RESISTANT TO DAMAGE FROM DECOMPRESSION

FIELD OF INVENTION

This invention relates in general to gate valves used in the oil and gas industry, and in particular to a process for forming a coating on a surface, where the coating can withstand decompression without being damaged.

DESCRIPTION OF RELATED ART

Thermoplastic materials are used to form various components used for the production of oil and gas. Seals within valves, such as gate valves, may be made wholly or partly from thermoplastics. A gate valve typically has a body with a cavity intersected by a flow passage. A gate in the gate valve moves in the cavity between a closed position, blocking flow through the flow passage and an open position, that allows flow through the flow passage. A stem engages an end of the gate, that when rotated in a particular direction, either raises or lowers the gate. The body of the gate valve generally includes a stem passage for which the stem to extend through. Stem seals are often provided between the stem and the stem passage, to seal therebetween and prevent leakage of pressure from the cavity.

Leakage from the flow passage and into the cavity is typically addressed by annular seals disposed in the cavity and coaxially registered with flow passage. Springs are usually included for pushing the seal against the gate to maintain the fluid flow barrier across the seal and gate interface. Thermoplastics however lose their resiliency over time and after being subjected to the high temperatures of downhole fluids.

SUMMARY OF INVENTION

Disclosed herein is a surface coating for protecting a material, such as a metal, from degradation due to ambient exposure. In an example embodiment disclosed is a valve assembly for use in handling fluids produced from a subterranean formation made up of components that are in sliding contact with one another and where a coating is on a surface of one of the components. The coating is made of a base layer on the surface having primer mixed with thermoplastic. Over the base layer is a thermoplastic layer, with an outer layer of thermoplastic and lubricant over the thermoplastic layer. In an example embodiment the primer includes a polymer, such as, a thermoplastic amorphous polymer, a polyimide, a polyamideimide, polyetheretherketone, or combinations of these. In an example embodiment the thermoplastic can be a polymer such as a polyetheretherketone, polyetherketoneketone, polyetherimide, polyethersulfone, chlorinated polyethylene, polyketone, or combinations thereof. In an example embodiment wherein the lubricant may be a polymer, such as, a fluoropolymer, polyvinylfluoride, polyvinylidene fluoride, polychlorotrifluoroethylene, perfluoroalkoxy, fluorinated ethylene-propylene, ethylene tetrafluoroethylene, polytetrafluoroethylene, polyethylenechlorotrifluoroethylene, or combinations thereof. The primer can be polyamideimide and the thermoplastic can be polyetheretherketone (PEEK). In an example embodiment, the amount of polyamideimide in the base layer ranges from about 60% to about 90% by volume and the amount of PEEK in the base layer ranges from about 10% to about 40% by volume. In an example embodiment the thermoplastic includes polyether-etherketone (PEEK) and the lubricant includes polytetrafluoroethylene (PTFE). Optionally, the amount of PEEK in the outer layer ranges from about 10% to about 40% by volume and the amount of PTFE in the outer layer ranges from about 60% to about 90% by volume. In an example embodiment, surfaces of the components in sliding contact include metal and one of the components is a seal.

Also disclosed herein is a method of coating a surface of a valve component. In an example embodiment the method includes applying a base layer of a mixture of a primer and a thermoplastic to the surface, cover the base layer with a thermoplastic layer; and adding an outer layer of thermoplastic and lubricant on the thermoplastic layer. The valve can be actuated so that the outer layer is in sliding contact with a metal surface. In an example embodiment, the base layer is bonded to the thermoplastic layer by melting the thermoplastic in the base layer. In an example embodiment the primer includes a polymer such as a thermoplastic amorphous polymer, a polyimide, a polyamideimide, polyetheretherketone, or combinations thereof. Optionally, the thermoplastic can includes polyetheretherketone, polyetherketoneketone, polyetherimide, polyethersulfone, chlorinated polyethylene, polyketone, or can be combinations thereof. In an example embodiment, the lubricant includes a fluoropolymer, polyvinylfluoride, polyvinylidene fluoride, polychlorotrifluoroethylene, perfluoroalkoxy, fluorinated ethylene-propylene, ethylene tetrafluoroethylene, polytetrafluoroethylene, polyethylenechlorotrifluoroethylene, as well as combinations thereof. Alternatively, the primer includes polyamideimide and the thermoplastic includes polyetheretherketone (PEEK). In an example embodiment, the amount of polyamideimide in the base layer ranges from about 60% to about 90% by volume and the amount of PEEK in the base layer ranges from about 10% to about 40% by volume. In an example embodiment, the thermoplastic has polyetheretherketone (PEEK) therein and the lubricant includes polytetrafluoroethylene (PTFE). In an example embodiment, the amount of PEEK in the outer layer can be from about 10% to about 40% by volume and the amount of PTFE in the outer layer can be from about 60% to about 90% by volume. Optionally, the surface is on a metal seal.

Yet further disclosed herein is a method of coating a surface of a metal seal of a valve component. In an example embodiment the method includes applying a base layer of a polyamideimide primer and a polyetheretherketone thermoplastic to the metal surface, on the base layer, applying a thermoplastic layer of polyetheretherketone, and applying an outer layer of about 10% to about 40% by volume of polyetheretherketone and about 60% by volume to about 90% by volume of polytetrafluoroethylene on the thermoplastic layer. The base layer is bonded with the thermoplastic layer by melting the polyetheretherketone in the base layer and the valve can be actuated so that the outer layer is in sliding contact with a metal surface.

DETAILED DESCRIPTION OF INVENTION

Coatings are typically applied to metal surfaces for shielding against elements that can corrode, degrade, or otherwise be damaging when exposed to metal. Thus when choosing a coating, consideration is often given for the particular elements ambient to where the metal surface will be situation. Ambient conditions also factor into deciding on a coating as some materials degrade under high pressure and/or temperature. The operating range and rate of change of an operational environment may drive material selection as fluctuations in ambient conditions can damage a coating.

Figure 1:
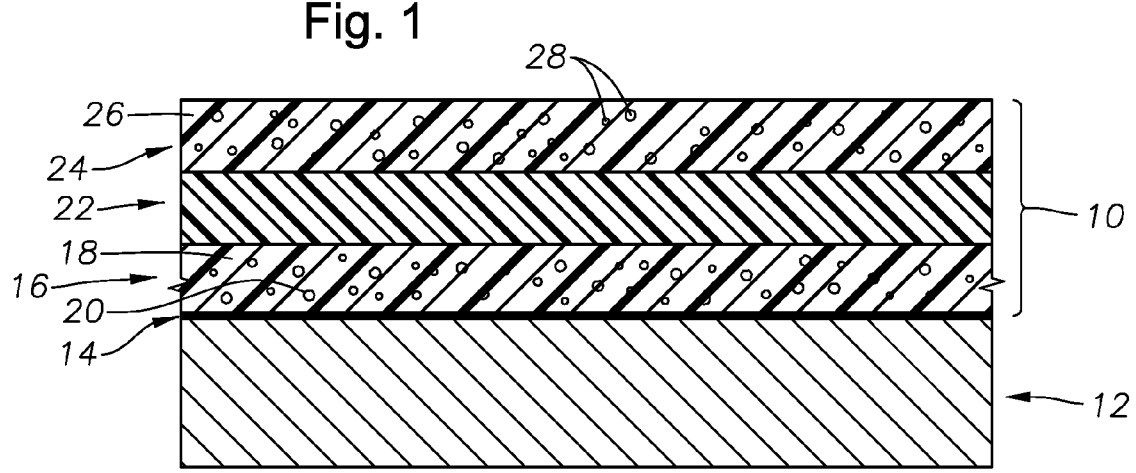
FIG. 1 is a sectional view of a protective coating on a substrate in accordance with an example embodiment of the present invention.

FIG. 1 illustrates an example embodiment of a coating 10 protecting an underlying substrate 12. The coating 10 is bonded to the substrate 12 along an interface 14 that defines the contact between the surface 12 and coating 10. The coating 10 is shown made up of layers where the layer directly on top of the substrate 12 is referred to as a base layer 16. In the embodiment of FIG. 1, the base layer 16 includes a mixture of a polymer primer. Examples of the polymer primer include thermoplastic amorphous polymer, a polyimide, a polyamideimide, polyetheretherketone, and combinations thereof.

Particles of a thermal plastic compound can be disbursed within the primer 16. Examples of thermal plastic compounds considered for use with the disclosure herein include, but are not limited to polyetheretherketone, polyetherketoneketone, polyetherimide, polyethersulfone, chlorinated polyethylene, polyketone, and combinations thereof. In example embodiments, the thermal plastic may make up from about 10% to about 40% by volume of the base layer 16. As such, the primer 18 in the base layer 16 may make up from about 60% to about 90% by volume of the base layer 16. On the side of the base layer 16 opposite the substrate 12 is a thermal plastic layer 20 that in an example embodiment can be substantially homogeneous and made of a single compound. In one example embodiment, the intermediate layer 22 is formed fully from a thermal plastic material and may be of the same material making up the thermal plastic 20 intermixed within the base layer 16.

An outer layer 24 is shown on a side of the intermediate layer 22 opposite the base layer 16, wherein the outer layer is made up of a matrix material with particles interspersed therein. In the embodiment of FIG. 1, the matrix includes a thermal plastic 26, which may be made of the same or similar to the thermal plastic 20. The particles 28 shown intermixed within the thermal plastic 26 can be a lubricant, example lubricants include but are not limited to fluoropolymer, polyvinylfluoride, polyvinylidene fluoride, polychlorotrifluoroethylene, perfluoroalkoxy, fluorinated ethylene-propylene, ethylene tetrafluoroethylene, polytetrafluoroethylene, polyethylenechlorotrifluoroethylene, and combinations thereof. One of the advantages of forming a protective layer 10 as illustrated in FIG. 1 is when cured, such as by heating, the base layer 16 adheres to both the surface of the substrate 12 and the intermediate layer 22 by virtue of melting the thermal plastic 20 in the base layer 16. By melting the thermal plastic 20 and allowing it to resolidify, bonding is realized between the base layer 16 and substrate 12 as well as the intermediate layer 22. Moreover, the novel composition is resistant to explosive decompression that can be damaging to other coatings. Therefore, the coating 10 provides significant advantages when applied to surfaces of a valve that may be subjected to large pressure and/or temperature fluctuations that can produce explosive decompression.

Figure 2:
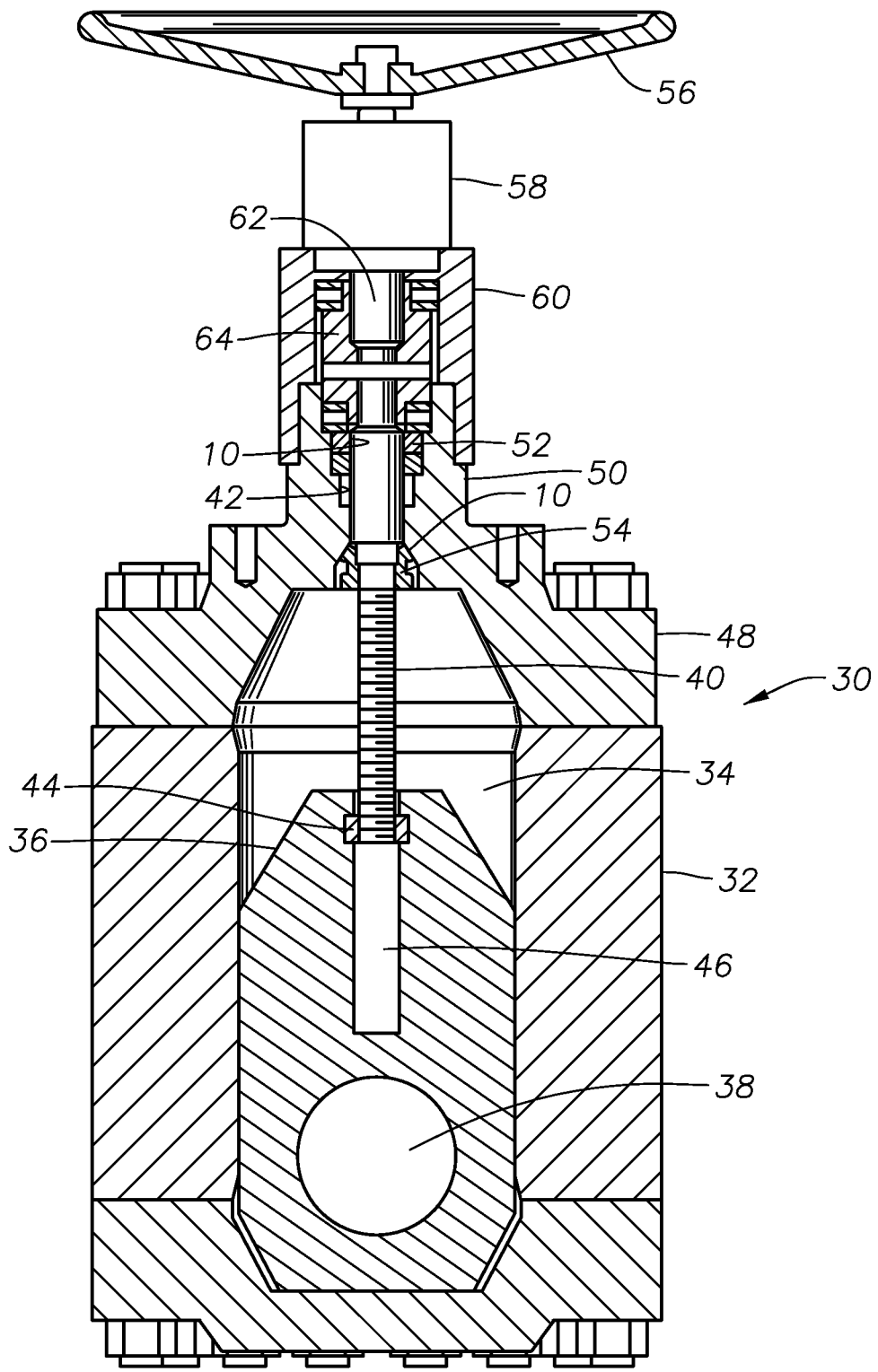
FIG. 2 is a sectional view of an example of a gate valve with seals having the protective coating of FIG. 1.

In one example of use, the layer 10 is shown applied to various components within a valve assembly 30. In the example of FIG. 2, the valve assembly 30 includes a valve body in which is formed a cavity for allowing axial movement of a gate 36 therein. The gate 36 includes an opening 38 therethrough and may be moved axially within the cavity 34 by its connection to a stem 40. The stem 40 is shown projecting upward from the gate 36 and through a stem passage 42. On the lower end of the stem 40 is a lock nut 44 for securing the stem 40 to the gate 36. An axial cavity 46 is provided in the gate 36 and in a portion adjacent the opening 38, the cavity 46 provides a space in which the stem 40 may extend into as the gate 36 is actuated axially within the body 32.

A valve bonnet 48 is shown mounted on an upper end of the body 32 for housing the actuation mechanisms for the gate 36. The upper end of the bonnet 48 narrows into a neck and through which the stem passage 42 is formed. Stem seals 52 are shown disposed within a widened portion of the stem passage 42 and provide a sealing function along the stem 40 to prevent pressure communication from the cavity 34 to external of the valve 30. On the surface of the stem seals 52, facing a moving portion of the stem 40, is a protective coating 10 as described in conjunction with FIG. 1. By applying the coating 10 on the sliding contact surface of the stem seals 52, the coating 10 protects the seals 52 from frictional damage. Moreover, as described above, the coating 10 will not suffer damage when exposed to pressure drops that may cause other such coatings to bubble and crack from explosive decompression.

Also shown within the bonnet 48 is a back seat seal assembly 54 circumscribing a portion of the stem 40 and having a surface in contact with the inner surface of the bonnet 48. A layer of coating 10 is shown on the surface of the back seat seal assembly 54 that contacts the bonnet 48. As discussed above, with regard to the stem seals 52, the coating 10 provides frictional protection for the back seat seal assembly 54 and without suffering the disadvantage of bubbling from explosive decompression.

The embodiment of FIG. 2 further includes a hand wheel 56 for actuating the gate 36. A gear box mechanically connected with the hand wheel 56 provides a mechanical advantage for moving the gate 36, where the gear box 58 is set on an annular collar 60 shown mounted on an upper end of the neck 50. An output shaft 62 depends downwardly from the gear box 58 into coupling engagement with the upper end of the stem 40. A bearing assembly 64 circumscribes the output shaft 62 and is mounted in an upper end of the inner portion of the collar 60.

Figure 3:
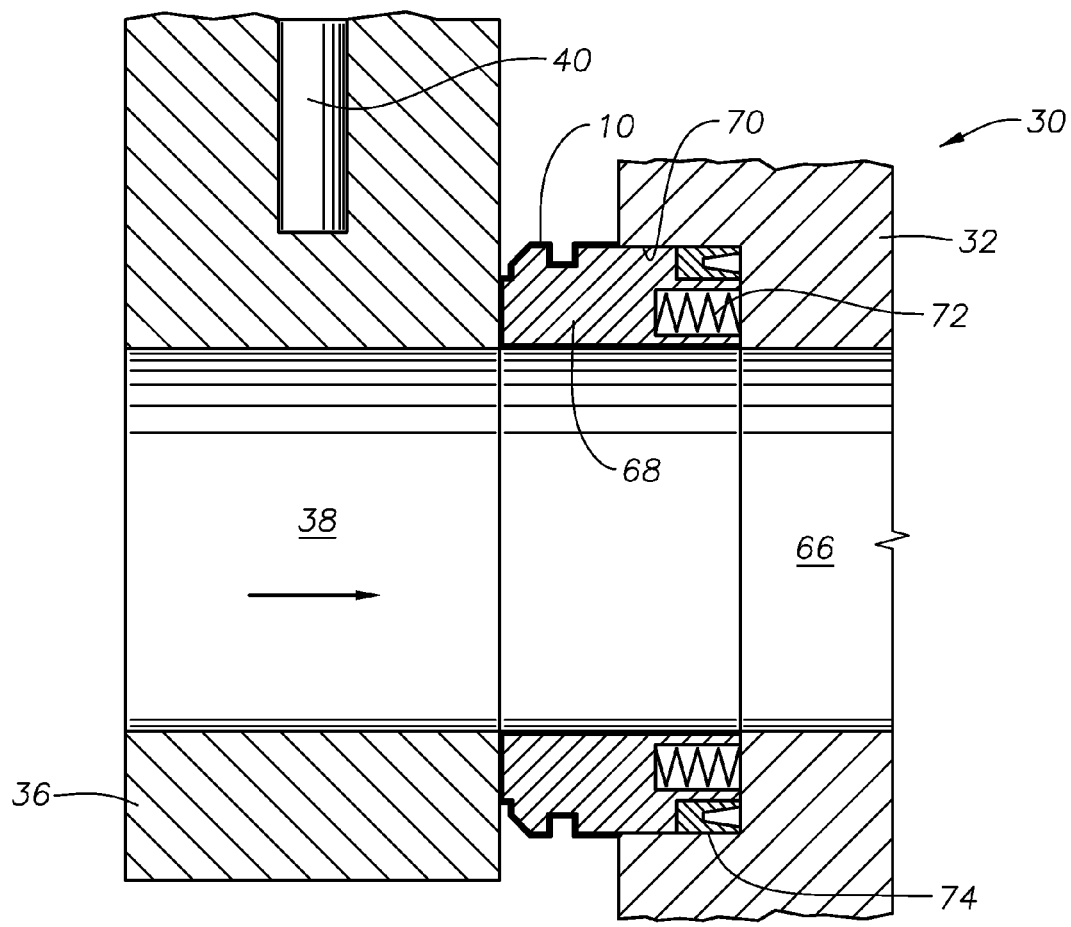
FIG. 3 is an enlarged sectional view of the gate valve of FIG. 2 with the coating of FIG. 1 applied to surfaces of a valve seat.

Shown in cross-sectional view in FIG. 3 is another application of the coating 10 in use with a valve assembly 30. In this example, the valve body 32 is shown having a flow passage 66 that flows through the body 32 and intersecting the cavity 34. In the example of FIG. 3, the gate 36 is positioned so that the opening 38 is registered with the passage 66. As shown, a valve seat 68 is mounted in a body pocket 70 formed in a side of the body 32 facing the gate 36. The valve seat 68 is an annular member and shown having a coating 10 on its face that is in contact with a side surface of the gate 36. As is known, the gate 36 is axially actuated by movement of the attached stem 40 such that the gate 36 slides with respect to the face of the valve seat 68. The coating 10 shown applied onto the sliding surface and adjacent outer surfaces of the valve seat 68 provides a surface that protects both the gate 36 and the valve seat 68 from damage due to the sliding contact; and as discussed above, the coating 10 is resistant to damage from decompression that damages other known coatings. Also illustrated in the example embodiment of FIG. 3, a spring 72 is shown in the end of the valve seat 68 nested in the body pocket 70. Circumscribing the end of the valve seat 68 opposite its contact with the gate is a seal for sealing between the body pocket 70 and valve seat 68.

Figure 4A:
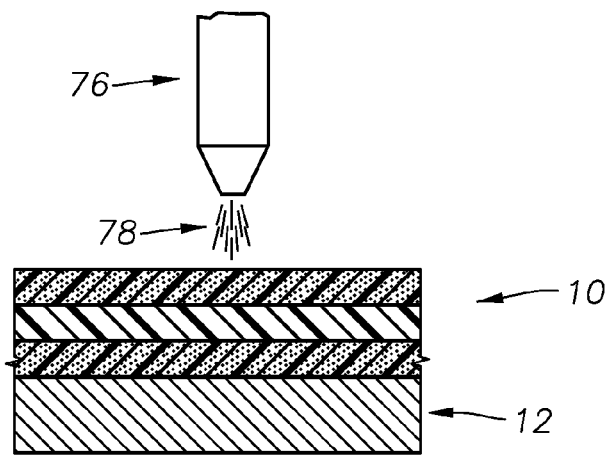
FIG. 4A is an example embodiment of forming a coating in accordance with the present invention.
Figure 4B:
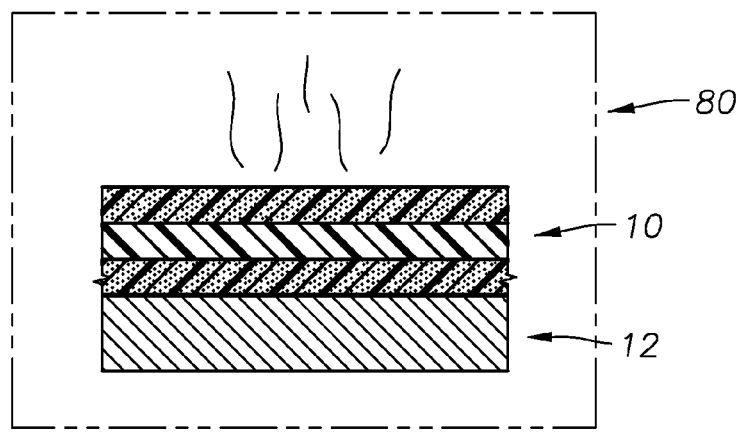
FIG. 4B is an example of a component being heated and having the coating of FIG. 4A in accordance with the present invention.

Shown in a side partial sectional view in FIG. 4A is one example embodiment of forming the coating 10 as described herein onto a component. In the example of FIG. 4A, a spray nozzle 76 is shown having an exit directed towards the substrate 12, wherein each layer is spray applied onto the substrate 12 and/or the preceding layers. The substrate 12 can be a surface of a component, where the component includes any part, including seals of a valve assembly. Exiting from the discharge of the spray nozzle 76 is a spray 78 representing the composition of each particular layer in a liquid form. Now referring to FIG. 4B, the component having the substrate 12 and applied coating 10 is shown placed in a heated environment, such as an oven 80 where heat is applied so that the temperature is increased above the melting point of the thermal plastic within the base layer 16. As described above, melting the thermal plastic and then allowing it to resolidify forms an improved bond between the base layer 16 and substrate 12 as well as between the intermediate layer 18 and base layer 16. In example embodiments, the base layer 16 has a thickness of up to about 1 ml including thicknesses of around 0.5 ml and about 0.75 ml. In example embodiments, the intermediate layer 22 and outer layer 24 have thicknesses that may range from about 1 ml up to about 5 ml. Other example embodiments exist wherein the thicknesses of the intermediate layer 22 and outer layer 24 can be any value between 1 ml and 5 ml. Further optionally, the spray technique shown in FIG. 4A may include a liquid dispersion application. Optionally, an electrostatic application may be included for adhering the spray on particles to the substrate 12 or preceding layers.

The present method described herein, therefore, is well adapted to carry out and attain the ends and advantages mentioned, as well as others inherent therein. While a presently preferred embodiment has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of coating a surface of a valve component comprising:
   a. applying a base layer of a mixture of a primer and a thermoplastic to the surface;
   b. applying a thermoplastic layer on a side of the base layer opposite the side on the surface;
   c. applying an outer layer of thermoplastic and lubricant disposed on a side of the thermoplastic layer opposite the base layer; and
   d. actuating the valve so that the outer layer is in sliding contact with a metal surface.

2. The method of claim 1, further comprising bonding the base layer with the thermoplastic layer by melting the thermoplastic in the base layer.

3. The method of claim 1, wherein the primer comprises a polymer selected from the group consisting of a thermoplastic amorphous polymer, a polyimide, a polyamideimide, polyetheretherketone, and combinations thereof.

4. The method of claim 1, wherein the thermoplastic comprises a polymer selected from the group consisting of polyetheretherketone, polyetherketoneketone, polyetherimide, polyethersulfone, chlorinated polyethylene, polyketone, and combinations thereof.

5. The method of claim 1, wherein the lubricant comprises a polymer selected from the group consisting of a fluoropolymer, polyvinylfluoride, polyvinylidene fluoride, polychlorotrifluoroethylene, perfluoroalkoxy, fluorinated ethylene-propylene, ethylene tetrafluoroethylene, polytetrafluoroethylene, polyethylenechlorotrifluoroethylene, and combinations thereof.

6. The method of claim 1, wherein the primer comprises polyamideimide and the thermoplastic comprises polyetheretherketone (PEEK).

7. The method of claim 1, wherein the amount of polyamideimide in the base layer comprises from about 60% to about 90% by volume and the amount of PEEK in the base layer comprises from about 10% to about 40% by volume.

8. The method of claim 1, wherein the thermoplastic comprises polyetheretherketone (PEEK) and the lubricant comprises polytetrafluoroethylene (PTFE).

9. The method of claim 8, wherein the amount of PEEK in the outer layer comprises from about 10% to about 40% by volume and the amount of PTFE in the outer layer comprises from about 60% to about 90% by volume.

10. The method of claim 1, wherein the surface is on a metal seal.

11. A method of coating a surface of a metal seal of a valve component, the method comprising:
    a. applying a base layer of a polyamideimide primer and a polyetheretherketone thermoplastic to the metal surface;
    b. applying a thermoplastic layer of polyetheretherketone on a side of the base layer opposite the side on the surface;
    c. applying an outer layer of about 10% to about 40% by volume of polyetheretherketone and about 60% by volume to about 90% by volume of polytetrafluoroethylene on a side of the thermoplastic layer opposite the base layer;
    d. bonding the base layer with the thermoplastic layer by melting the polyetheretherketone in the base layer; and
    e. actuating the valve so that the outer layer is in sliding contact with a metal surface.

12. A valve assembly for use in handling fluids produced from a subterranean formation comprising:
    components that are in sliding contact with one another;
    a coating on a surface of one of the components comprising:
      a base layer on the surface having primer mixed with thermoplastic,
      a thermoplastic layer on a side of the base layer opposite the side on the surface,
      an outer layer of thermoplastic and lubricant disposed on a side of the thermoplastic layer opposite the base layer.

13. The valve assembly of claim 12, wherein the primer comprises a polymer selected from the group consisting of a thermoplastic amorphous polymer, a polyimide, a polyamideimide, polyetheretherketone, and combinations thereof.

14. The valve assembly of claim 12, wherein the thermoplastic comprises a polymer selected from the group consisting of polyetheretherketone, polyetherketoneketone, polyetherimide, polyethersulfone, chlorinated polyethylene, polyketone, and combinations thereof.

15. The valve assembly of claim 12, wherein the thermoplastic layer contacts the base layer along an interface that is planar.

16. The valve assembly of claim 12, wherein the primer comprises polyamideimide and the thermoplastic comprises polyetheretherketone (PEEK).

17. The valve assembly of claim 16, wherein the amount of polyamideimide in the base layer comprises from about 60% to about 90% by volume and the amount of PEEK in the base layer comprises from about 10% to about 40% by volume.

18. The valve assembly of claim 12, wherein the thermoplastic comprises polyetheretherketone (PEEK) and the lubricant comprises polytetrafluoroethylene (PTFE).

19. The valve assembly of claim 18, wherein the amount of PEEK in the outer layer comprises from about 10% to about 40% by volume and the amount of PTFE in the outer layer comprises from about 60% to about 90% by volume, so that when the components are subjected to decompression, the coating remains free from bubbles and cracks.

20. The valve assembly of claim 12, wherein surfaces of the components in sliding contact comprise metal and one of the components comprises a seal.

21. A valve assembly for use in handling fluids produced from a subterranean formation comprising:
   components that are in sliding contact with one another;
   a coating on a surface of one of the components comprising:
      a base layer on the surface having primer mixed with thermoplastic,
      a thermoplastic layer on a side of the base layer opposite the side on the surface that is foamed fully from a thermoplastic,
      an outer layer of thermoplastic and lubricant disposed on a side of the thermoplastic layer opposite the base layer
   so that when the components are subjected to decompression, the coating remains free from bubbles and cracks.

22. The valve assembly of claim 21, wherein the thermplastic in the thermoplastic layer consists of polyetheretherketone.

23. The valve assembly of claim 21, wherein the thermoplastic layer has a thickness that exceeds a thickness of the base layer.

24. The valve assembly of claim 21, wherein the components comprise a stem and a stem seal, and wherein the coating is on a one of the surfaces of the stem or the stem seal.

25. A valve assembly for use in handling fluids produced from a subterranean formation comprising:
   a bonnet;
   an annular stem seal in the bonnet;
   a stem that that is in sliding contact with the stem seal;
   a coating on a surface of one of the annular stem seal comprising:
      a base layer on the surface having primer mixed with thermoplastic,
      a thermoplastic layer on a side of the base layer opposite the side on the surface that is formed fully from a thermoplastic,
      an outer layer of thermoplastic and lubricant disposed on a side of the thermoplastic layer opposite the base layer.

26. The valve assembly of claim 25, wherein stem seal blocks pressure communication along an axial portion of the stem.

27. The valve assembly of claim 25, wherein the thermoplastic in the thermoplastic layer consists of polyetheretherketone.

28. The valve assembly of claim 25, wherein all of the outer layer is spaced axially away from the base layer.

* * * * *